US012781542B2

(12) United States Patent
Winge et al.

(10) Patent No.: US 12,781,542 B2
(45) Date of Patent: Nov. 3, 2026

(54) VIAL TETHERING DEVICE

(71) Applicants: Justin William Winge, Huntersville, NC (US); Roger William Winge, Concord, NC (US)

(72) Inventors: Justin William Winge, Huntersville, NC (US); Roger William Winge, Concord, NC (US)

( * ) Notice: Subject to any disclaimer, the term of this patent is extended or adjusted under 35 U.S.C. 154(b) by 0 days.

(21) Appl. No.: 18/385,737

(22) Filed: Oct. 31, 2023

(65) Prior Publication Data

US 2024/0141700 A1 May 2, 2024

Related U.S. Application Data

(60) Provisional application No. 63/421,291, filed on Nov. 1, 2022.

(51) Int. Cl.
*E05B 73/00* (2006.01)

(52) U.S. Cl.
CPC .......... *E05B 73/00* (2013.01); *E05B 73/0041* (2013.01)

(58) Field of Classification Search
CPC ... E05B 73/00; E05B 73/0017; E05B 73/0041
See application file for complete search history.

(56) References Cited

U.S. PATENT DOCUMENTS

| | | | | | |
|---|---|---|---|---|---|
| 4,471,982 | A * | 9/1984 | Nielsen, Jr. | G01F 15/007 | 292/307 B |
| 5,275,027 | A * | 1/1994 | Eklof | E05B 69/00 | 70/38 A |
| 6,251,686 | B1 * | 6/2001 | Studer | B01L 9/06 | 211/74 |
| 6,837,373 | B2 * | 1/2005 | Huang | A45F 5/021 | 206/480 |
| 8,432,286 | B2 * | 4/2013 | Kolton | E05B 73/0041 | 340/572.1 |
| 11,142,930 | B2 * | 10/2021 | Strassburger | E05B 73/0005 | |
| 2007/0062903 | A1 * | 3/2007 | Norman | B65D 55/0863 | 215/901 |
| 2010/0085191 | A1 * | 4/2010 | Kolton | G08B 13/2445 | 340/572.8 |
| 2010/0126238 | A1 * | 5/2010 | Mazzucchelli | E05B 73/0035 | 70/58 |
| 2017/0319436 | A1 * | 11/2017 | Sharpe | B01L 9/06 | |

* cited by examiner

*Primary Examiner* — Christopher J Boswell
(74) *Attorney, Agent, or Firm* — AVEK IP, LLC; Blake E. Vande Garde

(57) ABSTRACT

A medication vial lock comprising a first arm having a body, an upper surface, a lower surface, and a slot located on one side of the first arm, a second arm pivotally engaged with the first arm, the second arm having a body, an upper surface, a lower surface, and a slot located on one side of the second arm, wherein the slot located on the first arm and the slot located on the second arm are designed to encircle a medicine vial, a first aperture on the first arm extending through the body from the upper surface to the lower surface, a first lock aperture on the first arm extending through the body from the upper surface to the lower surface, and a second lock aperture on the second arm extending through the body from the upper surface to the lower surface.

10 Claims, 7 Drawing Sheets

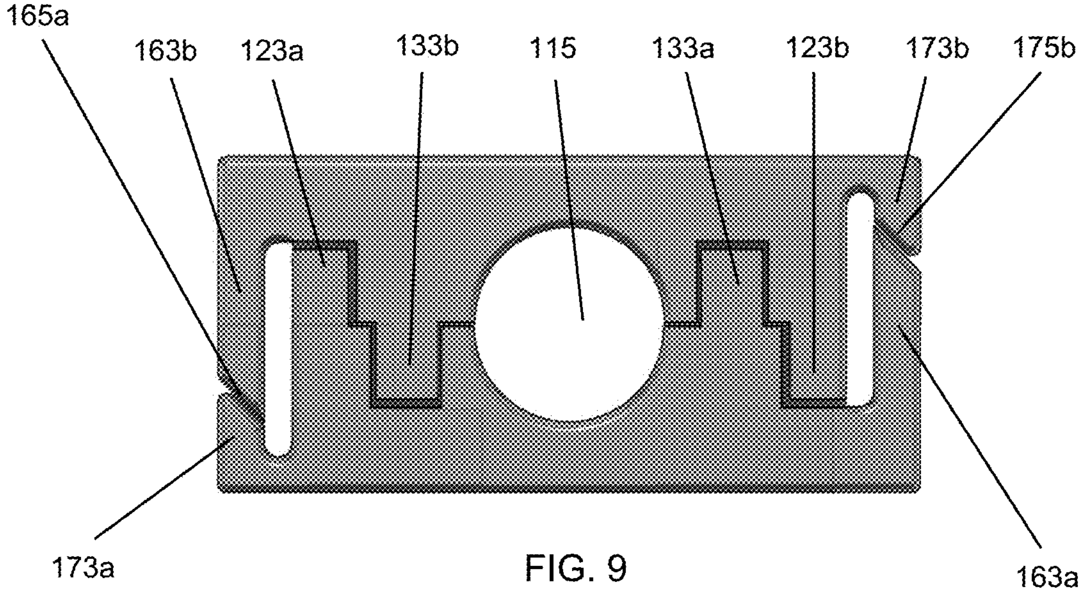
FIG. 9
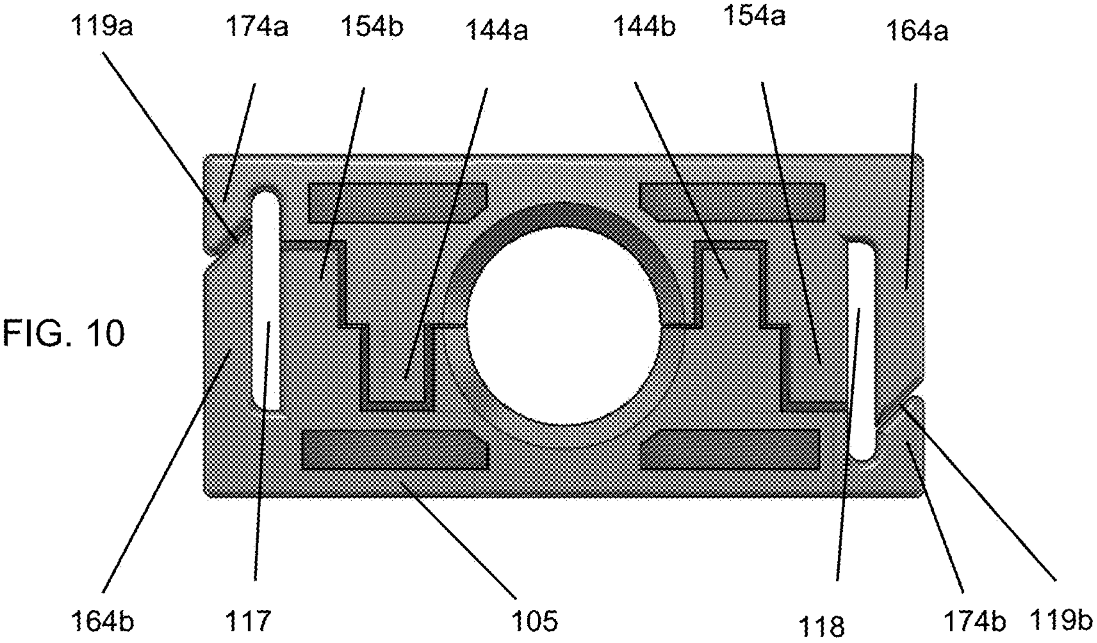
FIG. 10
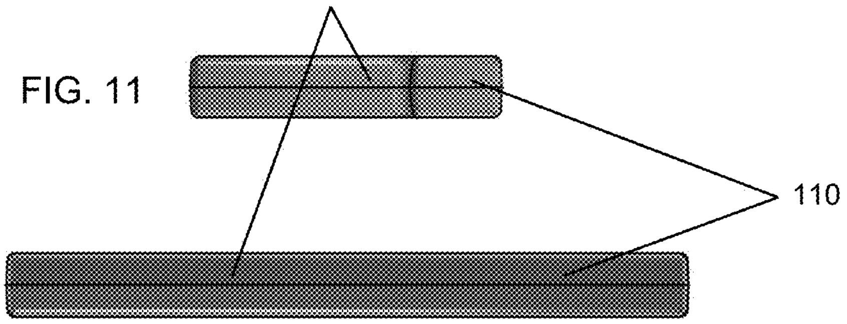
FIG. 11
FIG. 12

VIAL TETHERING DEVICE

FIELD OF INVENTION

The present invention relates to devices and methods used to organize, secure, and store medication for patients. More specifically, the present invention relates to devices and methods which focus on cost-savings and patient safety through organizing, safeguarding, and securing medication for patients.

RELATED CASES

This Application claims the benefit of U.S. Provisional Patent Application No. 63/421,291 filed on Nov. 1, 2022. The full disclosure of this application is expressly incorporated herein by reference.

BACKGROUND OF THE INVENTION

Injectable medications dispensed as vials are handled multiple times by multiple medical professionals for multiple doses. This allows any vial of medication to be left unsecured, on the automated dispensing cabinet (ADC), misplaced in a patient's room, or accidentally carried off by a medical professional. This results in numerous issues including safety (accounting for lost vials), patient safety (medication administering errors due to the existence of multiple types of medications), inventory costs, and the loss/waste of medications.

Thus, there remains a current need for a device to secure vials of medication within an ADC to improve safety, patient safety, reduce inventory costs and to lessen or prevent the loss/waste of medications.

SUMMARY

A medication vial lock comprising a first arm having a body, an upper surface, a lower surface, and a slot located on one side of the first arm, a second arm pivotally engaged with the first arm, the second arm having a body, an upper surface, a lower surface, and a slot located on one side of the second arm, wherein the slot located on the first arm and the slot located on the second arm are designed to encircle a medicine vial, a first aperture on the first arm extending through the body from the upper surface to the lower surface, a first lock aperture on the first arm extending through the body from the upper surface to the lower surface, and a second lock aperture on the second arm extending through the body from the upper surface to the lower surface.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 9 is a top view of one embodiment of the instant invention.

FIG. 10 is a bottom view of one embodiment of the instant invention.

FIG. 11 is a side view of one embodiment of the instant invention.

FIG. 12 is a front view of one embodiment of the instant invention.

DETAILED DESCRIPTION

Figure 1:
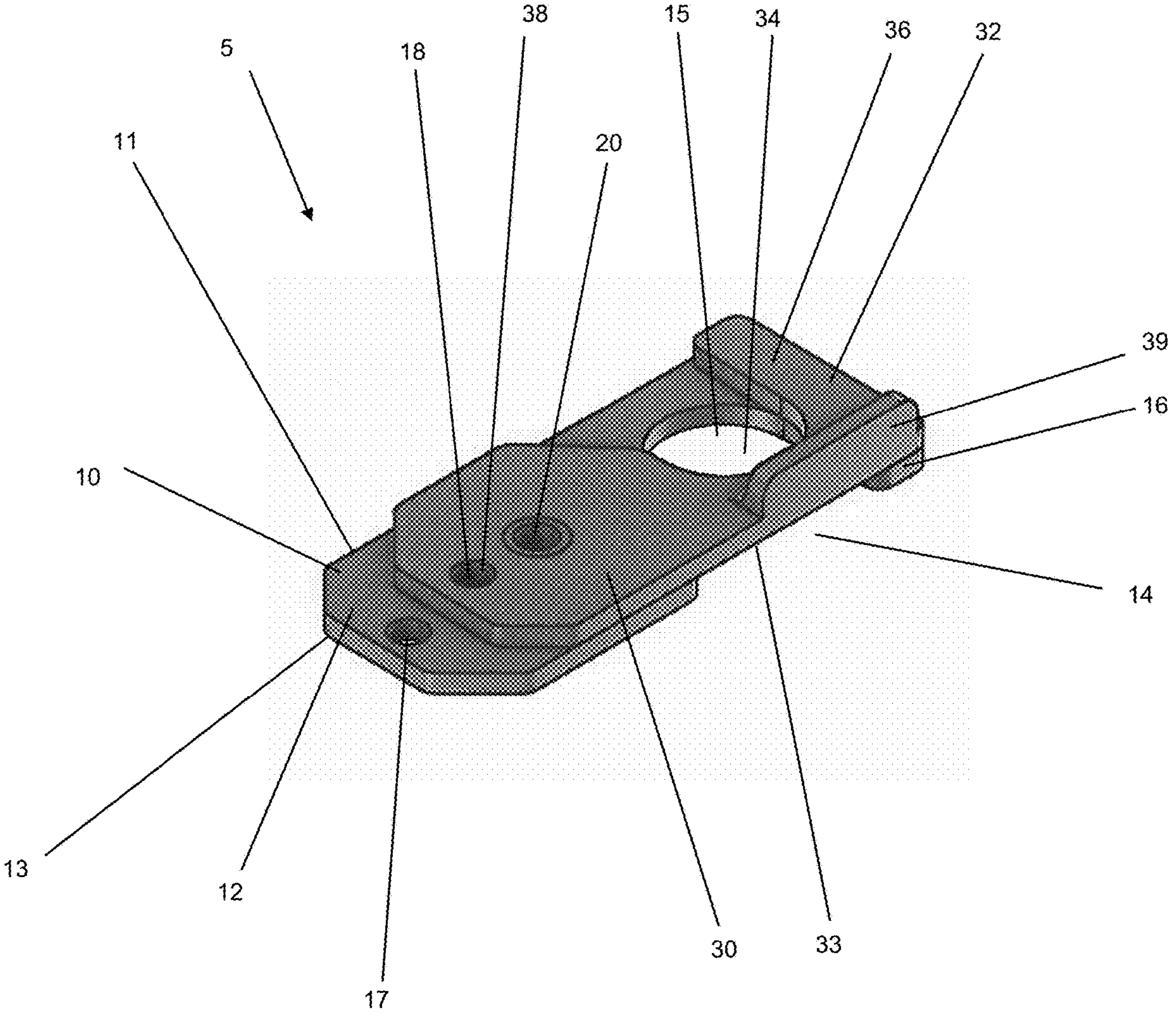
FIG. 1 is a perspective view of one embodiment of the instant invention.
Figure 2:
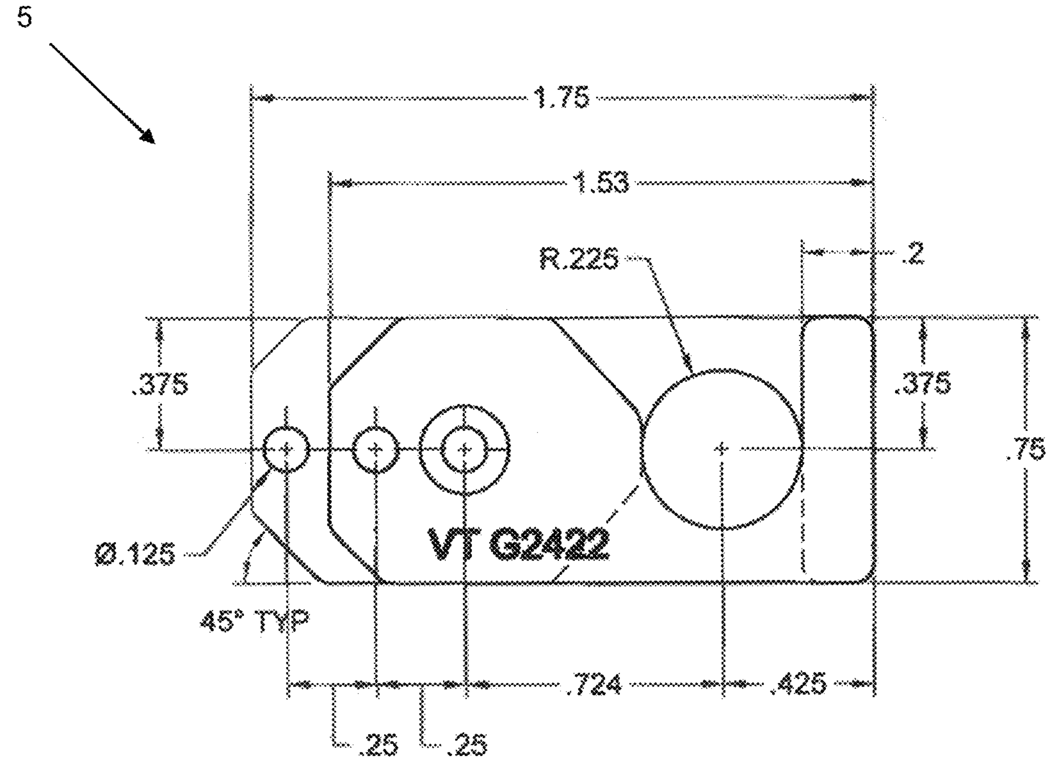
FIG. 2 is a top view of one embodiment of the instant invention.
Figure 3:
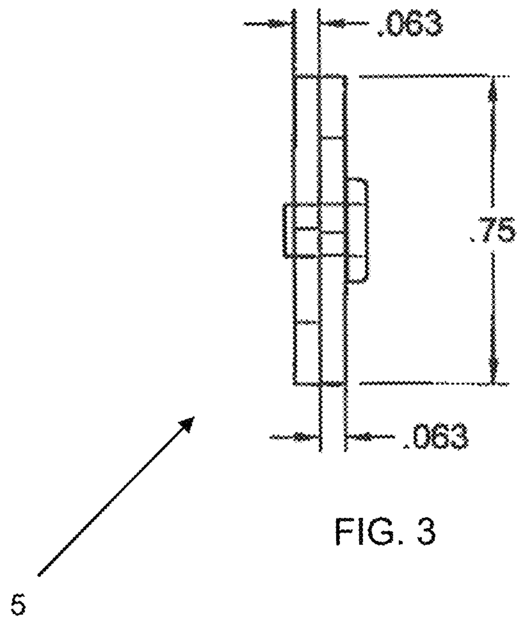
FIG. 3 is a side view of one embodiment of the instant invention.
Figure 4:
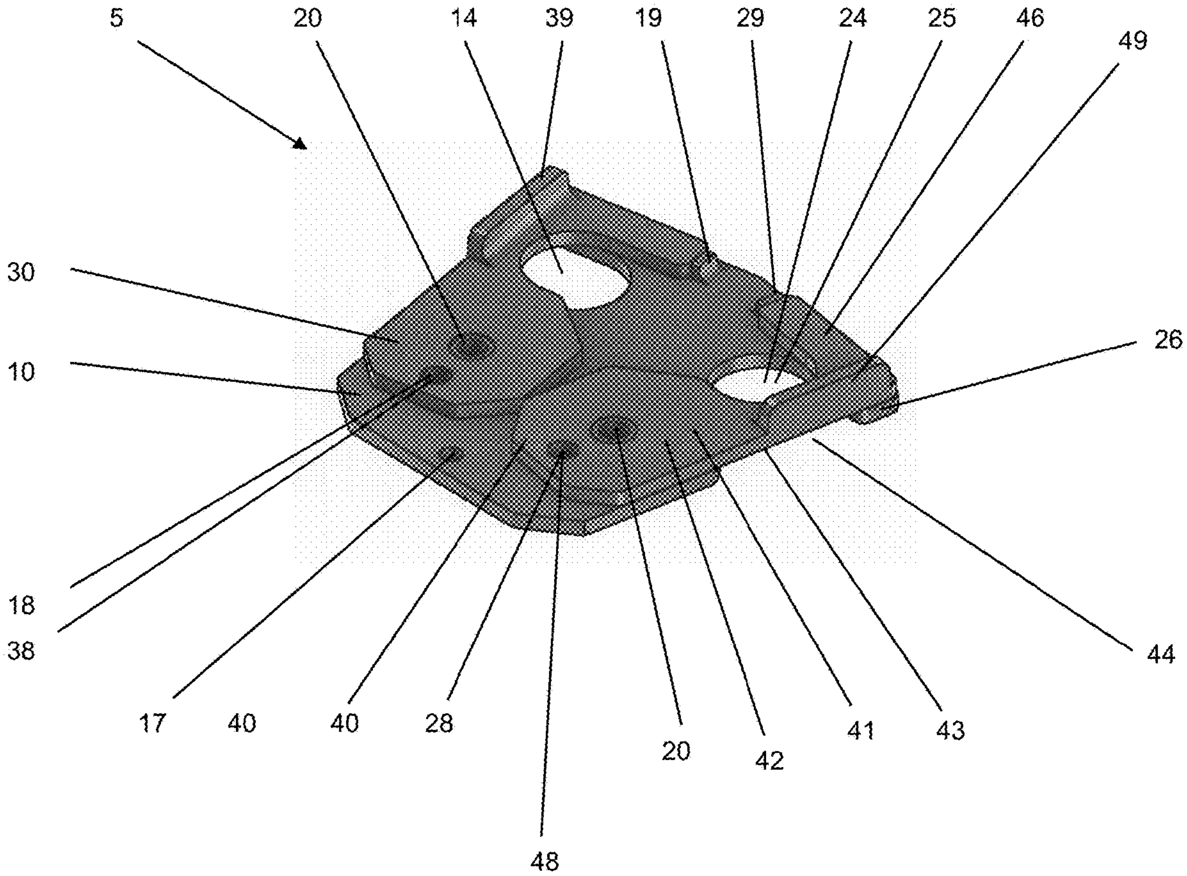
FIG. 4 is a perspective view of one embodiment of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention discloses a pivoting, lockable medication vial lock used to keep medications within automated dispensing cabinets. More specifically, the instant invention discloses a medication vial lock 5 comprising a base 10 having a body 11, an upper surface 12, a lower surface 13, and a first slot 14 located on one side of the base 10. A first arm 30 pivotally engaged with the base 10, the first arm 30 having a body 31, an upper surface 32, a lower surface 33, and a slot 34 located on one side of the first arm 30, wherein the first slot 14 located on the base 10 and the slot 34 located on the first arm 30 form a first vial aperture 15 designed to encircle a medicine vial 7. A first aperture 17 on the base 10 extends through the body 11 from the upper surface 12 to the lower surface 13, a first base lock aperture 18 on the base 10 extends through the body 11 from the upper surface 12 to the lower surface 13, and a first lock aperture 38 on the first arm 30 extends through the body 31 from the upper surface 32 to the lower surface 33.

The instant invention can further include a locking device 55 installed through the first base lock aperture 18 and first lock aperture 38 to secure a vial of medication 7 therein. The medication vial lock 5 can further include a tether 50 with a first end 51 and a second end 52, where in the first end 51 is secured to the first aperture 17 on the base 10, and the second end 52 is secured within a medication storage cabinet. The medication vial lock 5 can include a raised wall 39 emanating from the upper surface 32 of the first arm 30, the raised wall 39 being located on the opposite side of the slot 34 located on the first arm 30. The medication vial lock 5 can also include one or more additional medication vial locks 5, as described herein, permanently or removably secured to the medication vial lock 5. The components of the medication vial lock 5 are comprised of plastic, metal, ceramic, or a combination thereof.

The instant invention also discloses a medication vial lock 5 comprising a base 10 having a body 11, an upper surface 12, a lower surface 13, a first slot 14 located on one side of the body 11, and a second slot 24 located on the opposite side of the base 10. A first arm 30 is pivotally engaged with the base 10, the first arm 30 having a body 31, an upper surface 32, a lower surface 33, and a slot 34 located on one side of the first arm 30, wherein the first slot 14 located on the base 10 and the slot 34 located on the first arm 30 form a first vial aperture 15 designed to encircle a medicine vial 7. A second arm 40 is pivotally engaged with the base 10, the second arm 40 having a body 41, an upper surface 42, a lower surface 43, and a slot 44 located on one side of the second arm 40, wherein the second slot 24 located on the base 10 and the slot 44 located on the second arm 40 form a second vial aperture 25 designed to encircle a medicine vial 7. A first aperture 17 on the base 10 extends through the body 11 from the upper surface 12 to the lower surface 13, a first base lock aperture 18 on the base 10 extends through the body 11 from the upper surface 12 to the lower surface 13, a first lock aperture 38 on the first arm 30 extends through the body 31 from the upper surface 32 to the lower surface 33, a second base lock aperture 28 on the base 10 extends through the body 11 from the upper surface 12 to the lower surface 13, and a second lock aperture 48 on the second arm 40 extending through the body 41 from the upper surface 42 to the lower surface 43.

The instant invention can further include a locking device 55 installed through the first base lock aperture 18 and first lock aperture 38 to secure a first vial of medication therein, and a locking device 55 installed through the second base lock aperture 28 and second lock aperture 48 to secure a second vial of medication therein. The medication vial lock 5 can further include a tether 50 with a first end 51 and a second end 52, where in the first end 51 is secured to the first aperture 17 on the base 10, and the second end 52 is secured within a medication storage cabinet. The medication vial lock 5 can include a raised wall 39 emanating from the upper surface 32 of the first arm 30, the raised 39 wall being located on the opposite side of the slot 34 located on the body 31, and a raised wall 49 emanating from the upper surface 42 of the second arm 40, the raised wall 49 being located on the opposite side of the slot 44 located on the body 41. The medication vial lock 5 can include a first base wall 19 emanating from the upper surface 12 of the base 10, the first base wall 19 being located proximal of the first slot 14 located on the base 10, and a second base wall 29 emanating from the upper surface 12 of the base 10, the second base wall 29 being located proximal of the second slot 24 located on the base 10. The medication vial lock 5 can also include one or more additional medication vial locks 5, as described herein, permanently or removably secured to the medication vial lock 5. The components of the medication vial lock 5 are comprised of plastic, metal, ceramic, or a combination thereof.

The medication vial lock 5 pivots around the neck of any vial(s) and can be locked with a pin, deterring anyone from moving that medication. The medication vial lock 5 is then tethered to the inside of any medication storage cabinet. By locking this device around the neck of the vial(s) it allows the medical professional to spin the vial and locate any information he/she would need (i.e., barcode, lot number, expiration date, name or drug concentration). Having a locking device that does not touch the port of the vial(s) allows for optimal safety by preventing that medication from being left out and or going in/out patient care areas and potentially contaminating that vial. This device also can produce huge cost savings from medications that get lost, stolen or misused. The instant invention also includes a method of securing medication comprising the steps of:

a) providing a medication vial lock 5 comprising:
  - a base 10 having a body 11, an upper surface 12, a lower surface 13, and a slot 14 located on one side of the base 10;
  - a first arm 30 pivotally engaged with the base 10, the first arm 30 having a body 31, an upper surface 32, a lower surface 33, and a slot 34 located on one side of the first arm 30;
    - wherein the first slot 14 located on the base 10 and the slot 34 located on the first arm 30 form a first vial aperture 15 designed to encircle a medicine vial;
  - a first aperture 17 on the base 10 extending through the body 11 from the upper surface 12 to the lower surface 13;
  - a first base lock aperture 18 on the base 10 extending through the body 11 from the upper surface 12 to the lower surface 13; and
  - a first lock aperture 38 on the first arm 30 extending through the body 31 from the upper surface 32 to the lower surface 33;

b) pivotally rotating the first arm 30 relative to the base 10;

c) placing a medication vial 7 within the first slot 14 located on the base 10;

d) pivotally rotating the first arm 30 back towards the base 10 to enclose the medication vial 7 within the first vial aperture 15;

e) providing a tether 50 with a first end 51 and a second end 52;
f) securing the first end 51 of the tether 50 to the first aperture 17 on the base 10; and
g) securing the second end 52 of the tether 50 within a medical storage cabinet.

The instant invention also includes a method of securing medication comprising the steps of:

a) providing a medication vial lock 5 comprising:
   a base 10 having a body 11, an upper surface 12, a lower surface 13, a first slot 14 located on one side of the body 11, and a second slot 24 located on the opposite side of the base 10;
   a first arm 30 is pivotally engaged with the base 10, the first arm 30 having a body 31, an upper surface 32, a lower surface 33, and a slot 34 located on one side of the first arm 30,
      wherein the first slot 14 located on the base 10 and the slot 34 located on the first arm 30 form a first vial aperture 15 designed to encircle a medicine vial 7;
   a second arm 40 is pivotally engaged with the base 10, the second arm 40 having a body 41, an upper surface 42, a lower surface 43, and a slot 44 located on one side of the second arm 40,
      wherein the second slot 24 located on the base 10 and the slot 44 located on the second arm 40 form a second vial aperture 25 designed to encircle a medicine vial 7;
   a first aperture 17 on the base 10 extending through the body 11 from the upper surface 12 to the lower surface 13;
   a first base lock aperture 18 on the base 10 extending through the body 11 from the upper surface 12 to the lower surface 13;
   a first lock aperture 38 on the first arm 30 extends through the body 31 from the upper surface 32 to the lower surface 33;
   a second base lock aperture 28 on the base 10 extends through the body 11 from the upper surface 12 to the lower surface 13; and
   a second lock aperture 48 on the second arm 40 extending through the body 41 from the upper surface 42 to the lower surface 43;
b) pivotally rotating the first arm 30 relative to the base 10;
c) placing a medication vial 7 within the first slot 14 located on the base 10;
d) pivotally rotating the first arm 30 back towards the base 10 to enclose the medication vial 7 within the first vial aperture 15;
e) Pivotally rotating the second arm 40 relative to the base 10;
f) placing a medication vial 7 within the second slot 24 located on the base 10;
g) pivotally rotating the second arm 40 back towards the base tend to enclose the medication vial 7 within the second vial aperture 25;
h) providing a tether 50 with a first end 51 and a second end 52;
i) securing the first end 51 of the tether 50 to the first aperture 17 on the base 10; and
j) securing the second end 52 of the tether 50 within a medical storage cabinet.

Figure 5:
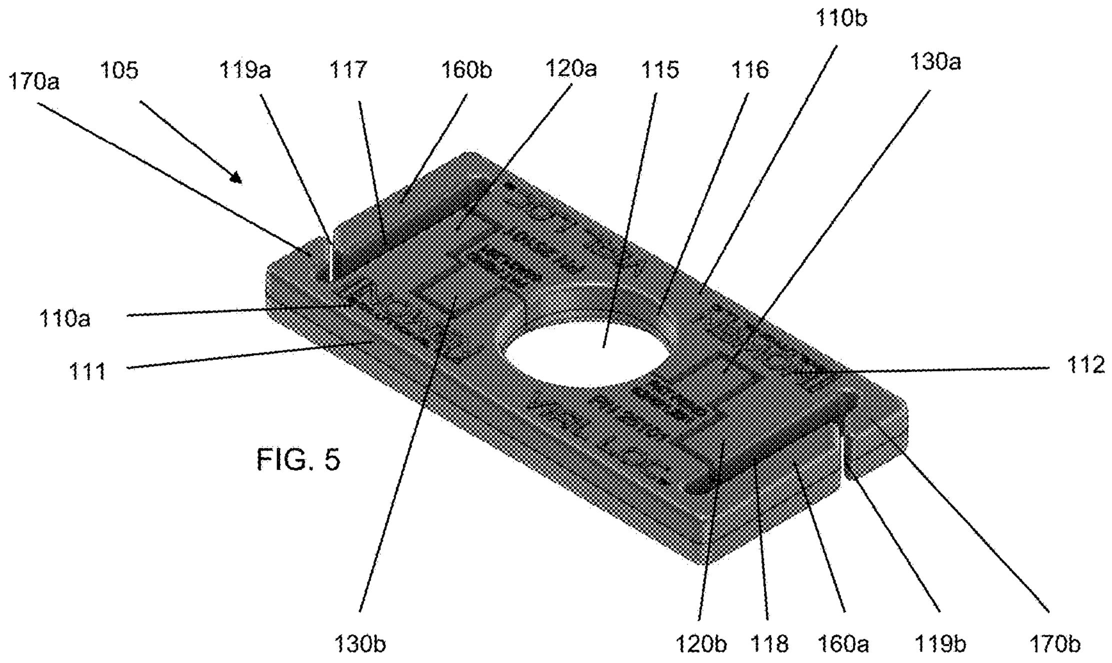
FIG. 5 is a perspective view of one embodiment of the instant invention.
Figure 6:
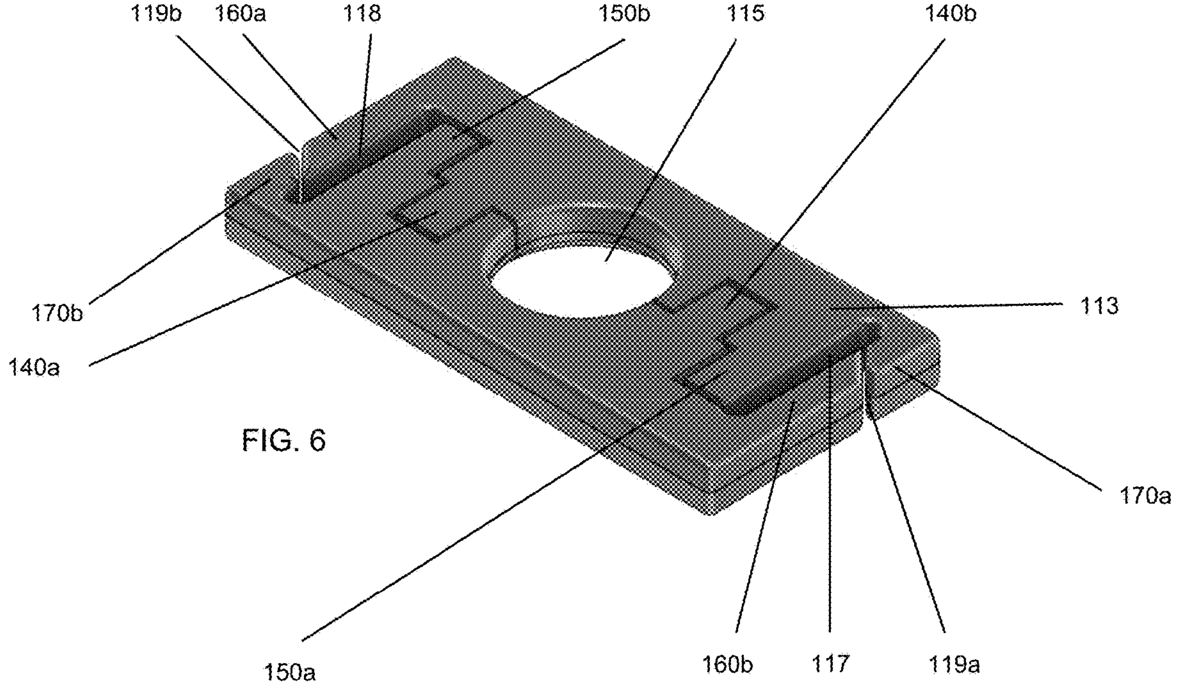
FIG. 6 is a perspective view of one embodiment of the instant invention.
Figure 7:
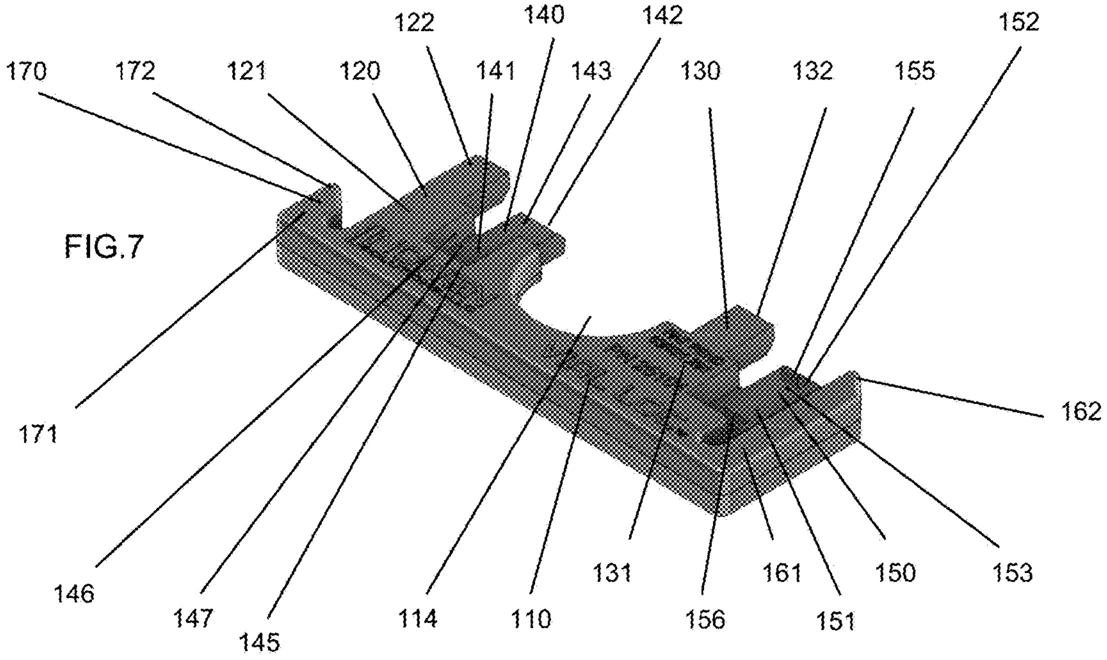
FIG. 7 is a perspective view of one embodiment of the instant invention.
Figure 8:
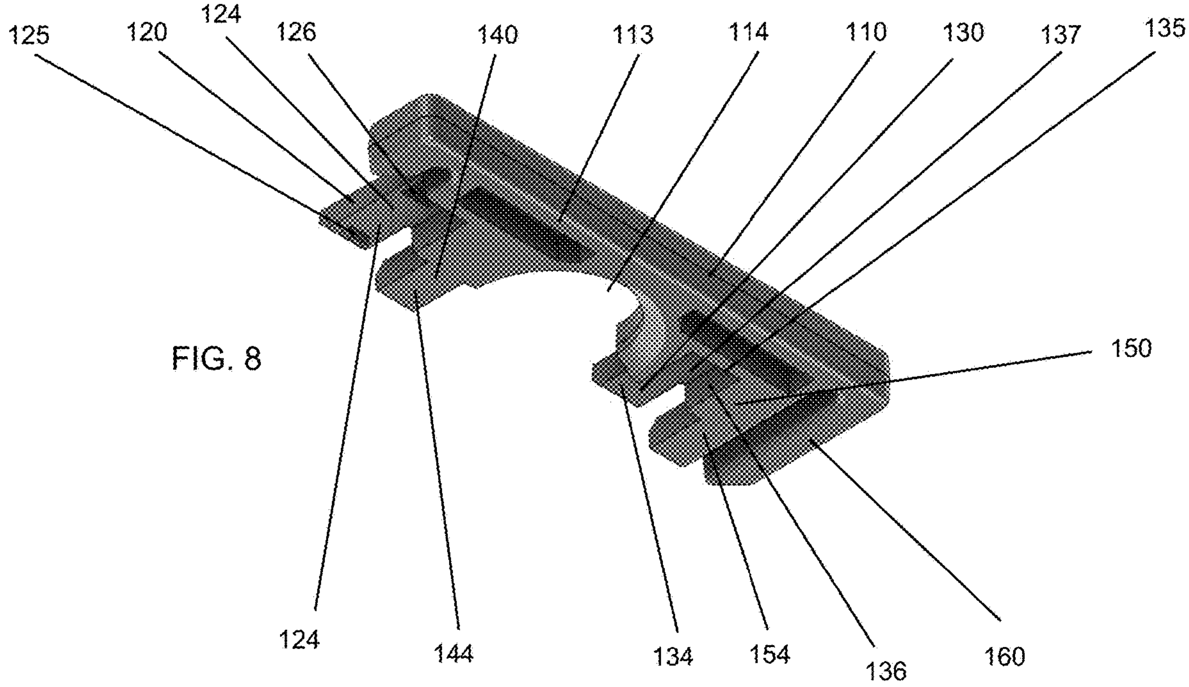
FIG. 8 is a perspective view of one embodiment of the instant invention.
Figure 13:
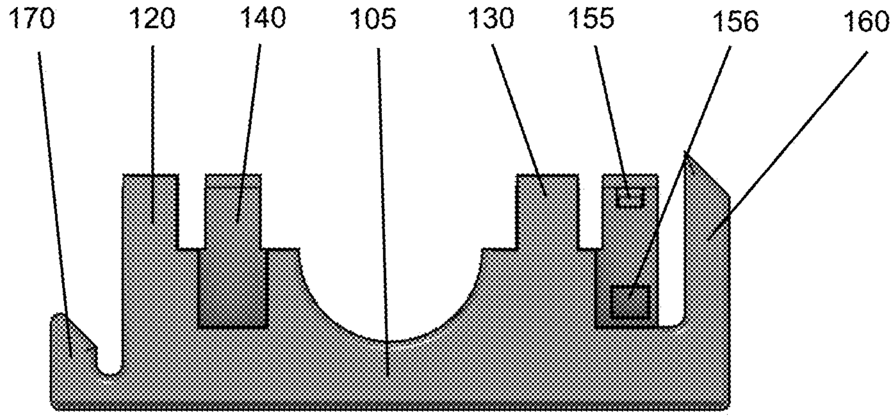
FIG. 13 is a top view of one embodiment of the instant invention.
Figure 14:
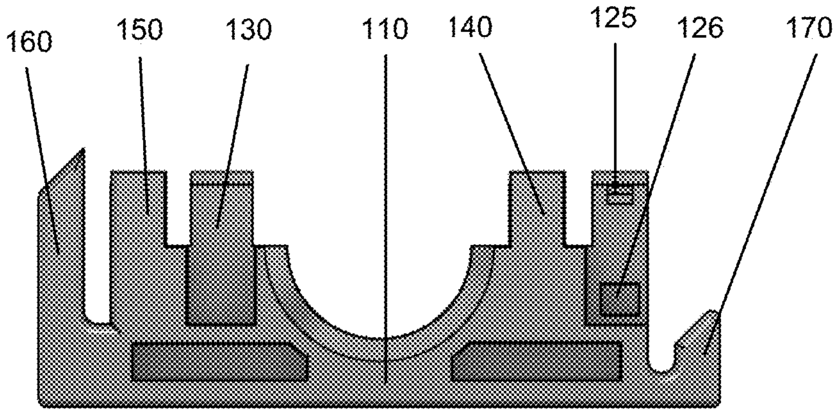
FIG. 14 is a bottom view of one embodiment of the instant invention.
Figure 15:
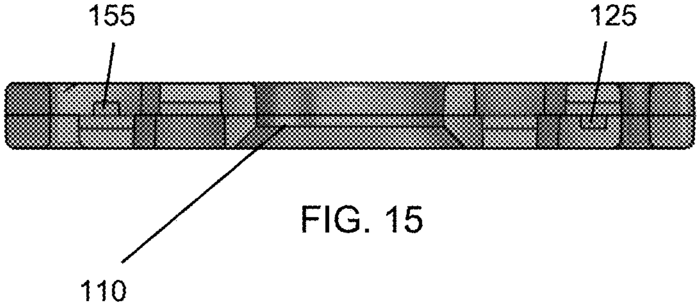
FIG. 15 is a front view of one embodiment of the instant invention.
Figure 16:
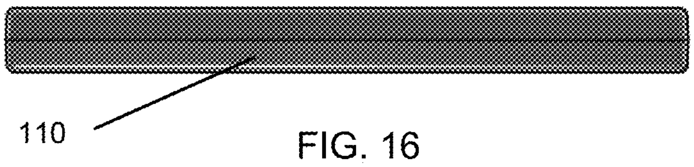
FIG. 16 is a back view of one embodiment of the instant invention.

The instant invention also includes a medication vial lock 105 as illustrated in FIGS. 5-16. The medication vial lock 105 includes a pair of bases, 110*a* and 110*b*, which are joined together to form a medication vial lock 105. The pair of bases can be identical, nearly identical, or different from one another. Each base includes a body 111, an upper surface 112, a lower surface 113, a plurality of extension arms, and a slot 114 defined by a wall 116. Looking to the figures, it is illustrated that the pair of bases interlock with one another to form the medication vial lock 105 which includes a vial aperture 115 which is formed when the pair of bases is joined together and each slot 114 forms half of the vial aperture 115. A first aperture 117 and a second aperture 118 are also formed when the pair of bases interlock with one another. The first aperture 117 and the second aperture 118 can be either fully enclosed or accessible from the exterior of the medication vial lock 105 by way of a channel 119 located on the outer surface of the medication vial lock.

Looking more closely at the base 110, it includes a body 111 from which a plurality of extension arms emanate. These extension arms include a first upper extension arm 120 which emanates and extends away from the body. The first upper extension arm includes a proximal end 121 connected to the body 111, a distal end 122 located opposite of the proximal end, an upper surface 123, and a lower surface 124. The upper surface can be at the same surface as the upper surface 112 of the base 110. The lower surface 124 includes a clip extension 125 located on the distal end of the first upper extension arm which emanates outward from the lower surface 124.

The lower surface 124 also includes a clip receptacle 126 which extends from the lower surface 124 inward into the first upper extension arm. The clip extension 125 is designed to interact with and insert into a clip receptacle (i.e., 156) on an extension arm of the other base while the clip receptacle 126 is designed to interact with and accept the insertion of a clip extension (i.e., 155) on the extension arm of the other base.

The base further includes a second upper extension arm 130 which emanates and extends away from the body 111. The second upper extension arm 130 includes a proximal end 131 connected to the body 111, a distal end 132 located opposite of the proximal end, an upper surface 133, and a lower surface 134. The upper surface 133 can be the same surface as the upper surface 112 of the base 110. The lower surface 134 is essentially flat and with the lower surface 113 of the body, forms a niche 137 defined by a back wall 135 and a pair of side walls 136.

The base further includes a first lower extension arm 140 which emanates and extends away from the body 111. The first lower extension arm 140 includes A proximal end 141 connected to the body 111, a distal end 142 located opposite of the proximal end, an upper surface 143, and a lower surface 144. The lower surface 144 can be the same surface as the lower surface 114 of the base 110. The upper surface 143 is essentially flat and with the upper surface 112 of the body, forms a niche 147 defined by a back wall 145 and a pair of side walls 146.

The base further includes a second lower extension arm 150 which emanates and extends away from the body 111. The second lower extension arm includes a proximal end 151 connected to the body 111, a distal end 152 located opposite of the proximal end, an upper surface 153, and a lower surface 154. The lower surface 154 can be the same surface as the lower surface 114 of the base 110. The upper surface 153 includes a clip extension 155 located on the distal end of the second lower extension arm which emanates outward from the upper surface 153. The upper surface 153 also includes a clip receptacle 156 which extends from the upper surface 153 inward into the second lower extension arm. The clip extension 155 is designed to interact with and insert into a clip receptacle (i.e., 126) on an extension arm of the other base while the clip receptacle 156 is designed to interact with and accept the insertion of a clip extension (i.e., 125) on the extension arm of the other base.

The base further includes a first side arm 160 which emanates and extends away from the body 111. The first side arm includes a proximal end 161 connected to the body, a distal end 162 located opposite of the proximal end, an upper surface 163, a lower surface 164, and an end surface 165 located and forming the distal end of the first side arm 160. The base further includes a second side arm 170 which emanates and extends away from the body 111. The second side arm includes a proximal end 171 connected to the body, a distal end 172 located opposite of the proximal end, an upper surface 173, a lower surface 174, and an end surface 175 located and forming the distal end of the second side arm 170.

As shown in the figures, the medication vial lock is formed with a pair of bases 110*a* and 110*b* which are identical to one another. The second base 110*b* is rotated 180 degrees relative to the first base 110*a* to allow the joining of the two bases. The first upper extension arm 120*a* of the first base 110*a* is operationally associated with the second lower extension arm 150*b* of the second base 110*b*. The clip extension 125*a* of the first upper extension arm 120*a* engages with and is inserted into the clip receptacle 156*b* of the second lower extension arm 150*b*. The clip extension 155*b* of the second lower extension arm 150*b* engages with and is inserted into the clip receptacle 126*a* of the first upper extension arm 120*a*. The second lower extension arm 150*a* of the first base 110*a* is operationally associated with the first upper extension arm 120*b* of the second base 110*b*. The clip extension 155*a* of the second lower extension arm 150*a* engages with and is inserted into the clip receptacle 126*b* of the first upper extension arm 120*b*. The clip extension 125*b* of the first upper extension arm 120*b* engages with and is inserted into the clip receptacle 156*a* of the second lower extension arm 150*a*. The second upper extension arm 130*a* of the first base 110*a* is operationally associated with the first lower extension arm 140*b* of the second base 110*b*. The lower surface 134*a* of the second upper extension arm 130*a* engages with the upper surface 143*b* of the first lower extension arm 140*b* and the distal end 132*a* of the second upper extension arm 130*a* is inserted into the niche 147*b* and engages with the back wall 145*b* of the first lower extension arm 140*b*. The first lower extension arm 140*a* of the first base 110*a* is operationally associated with the second upper extension arm 130*b* of the second base 110*b*. The upper surface 143*a* of the first lower extension arm 140*a* engages with the lower surface 134*b* of the second upper extension arm 130*b* and the distal end 142*a* of the first lower extension arm 140*a* is inserted into the niche 137*a* and engages with the back wall 135*b* of the second upper extension arm 130*b*. The first side arm 160*a* of the first base 110*a* engages with the second side arm 170*b* of the second base 110*b*, while the first side arm 160*b* of the second base 110*b* engages with the second side arm 170*a* of the first base 110*a* forming a first aperture 117 and a second aperture 118. The end surface 165*b* of the first side arm 160*b* can engage the end surface 175*a* of the second side arm 170*a* to form the first aperture 117. The end surface 165*a* of the first side arm 160*a* can engage the end surface. 175*b* of the second side arm 170*b* to form the second aperture 118. Each end surface can either physically engage the opposite surface, resulting in no channel to access the aperture, or they can not physically engage the opposite surface, resulting in a channel 119 to access the aperture. One end of a tether (not illustrated) may be secured to one or both apertures 117, 118 while the opposite end of the tether is secured to a drug dispensing device/machine.

The vial aperture 115 is formed from the slot 114*a* of the first base 110*a* and the slot 114*b* of the second base 110*b* when the pairs are joined together. A medicine vial (not illustrated) is placed between the first base 110*a* and second base 110*b* and secured by joining the bases together as described above.

In one embodiment of the instant invention, the lower surface 134 of each second upper extension arm 130 further includes a clip extension on the distal end of the lower surface which emanates outward from the lower surface 134, and a clip receptacle which extends from the lower surface 134 inward into the second upper extension arm, mimicking the design of the first upper extension arm 120. Additionally, the upper surface 143 of each first lower extension arm 140 further includes a clip extension on the distal end of the upper surface which emanates outward from the upper surface 143, and a clip receptacle which extends from the upper surface 143 inward into the first lower extension arm, mimicking the design of the second lower extension arm. The second upper extension arm 130 of the base 110 would be operationally associated with the first lower extension arm 140 of an opposite base where they would engage one another in the same manner as the first upper extension arm 120 engaging with a second lower extension arm 150 as described previously.

The instant invention also includes a method of securing a medicine vial comprising the steps of:

a. providing a medication vial lock 105 comprising:
  - a pair of bases 110 having a body 111, an upper surface 112, a lower surface 113, and a slot 114 located on one side of the base, with each base including;
  - a first upper extension arm 120 having a proximal end 121, a distal end 122, an upper surface 123, a lower surface 124, a clip extension 125 located on the distal end of the first upper extension arm which emanates outward from the lower surface, and a clip receptacle 126 which extends from the lower surface inward into the first upper extension arm;
  - a second upper extension arm 130 having a proximal end 131, a distal end 132, an upper surface 133, and a lower surface 134;
  - a first lower extension arm 140 having a proximal end 141, a distal end 142, an upper surface 143, and a lower surface 144;
  - a second lower extension arm 150 having a proximal end 151, a distal end 152, an upper surface 153, a lower surface 154, a clip extension 155 located on the distal end of the second lower extension arm which emanates outward from the upper surface, and a clip receptacle 156 which extends from the upper surface inward into the second lower extension arm;
  - a slot 114 formed between the first lower extension arm and the second upper extension arm;
  - a first side arm 160 having a proximal end 161, a distal end 162, an upper surface 163, a lower surface 164, and an end surface 165; and
  - a second side arm 170 having a proximal end 171, a distal end 172, an upper surface 173, a lower surface 174, and an end surface 175;

b. placing a medicine vial against the slot 114 of the first base 110*a;* c. rotating the second base 110*b* 180 degrees relative to the first base 110*a;* d. pushing the pair of bases together forming a vial aperture 115 within which a medicine vial can be secured;

e. providing a tether with a first end and a second end;

f. securing the first end of the tether to the first aperture on the base; and g. securing the second end of the tether within a drug dispensing device/machine.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A medication vial lock comprising:

a pair of identical bases having a body, an upper surface, a lower surface, and a slot located on one side of the base, with each base including at least four extension arms;

a first upper extension arm having a proximal end, a distal end, an upper surface, a lower surface, a clip extension located on the distal end of the first upper extension arm which emanates outward from the lower surface, and a clip receptacle which extends from the lower surface inward into the first upper extension arm;

a second upper extension arm having a proximal end, a distal end, an upper surface, and a lower surface;

a first lower extension arm having a proximal end, a distal end, an upper surface, and a lower surface;

a second lower extension arm having a proximal end, a distal end, an upper surface, a lower surface, a clip extension located on the distal end of the second lower extension arm which emanates outward from the upper surface, and a clip receptacle which extends from the upper surface inward into the second lower extension arm;

a slot formed between the first lower extension arm and the second upper extension arm;

a first side arm having a proximal end, a distal end, an upper surface, a lower surface, and an end surface; and a second side arm having a proximal end, a distal end, an upper surface, a lower surface, and an end surface;

wherein a first base is secured to a second base by rotating the second base 180 degrees relative to the first base and pushing the pair of bases together forming a vial aperture within which a medicine vial can be secured.

2. The medication vial lock of claim 1 further including an aperture formed between the first side arm, the second side arm, and the first upper extension arm, wherein one end of a tether is secured to the aperture while the opposite end of the tether is secured to a drug dispensing device/machine.

3. The medication vial lock of claim 1 where in the components of the medication vial lock are comprised of plastic, metal, ceramic, or a combination thereof.

4. The medication vial lock of claim 1 wherein the second upper extension arm further includes the lower surface forming a niche defined by a back wall and a pair of side walls, the niche being operationally associated with the first lower extension arm.

5. The medication vial lock of claim 1 wherein:

the first upper extension arm of the first base is operationally associated with the second lower extension arm of the second base;

the first upper extension arm of the second base is operationally associated with the second lower extension arm of the first base;

the second upper extension arm of the first base is operationally associated with the first lower extension arm of the second base; and the second upper extension arm of the second base is operationally associated with the first lower extension arm of the first base.

6. A method of securing a medicine vial comprising the steps of:

a. providing a medication vial lock comprising:

a pair of identical bases having a body, an upper surface, a lower surface, and a slot located on one side of the base, with each base including at least four extension arms;

a first upper extension arm having a proximal end, a distal end, an upper surface, a lower surface, a clip extension located on the distal end of the first upper extension arm which emanates outward from the lower surface, and a clip receptacle which extends from the lower surface inward into the first upper extension arm;

a second upper extension arm having a proximal end, a distal end, an upper surface, and a lower surface;

a first lower extension arm having a proximal end, a distal end, an upper surface, and a lower surface;

a second lower extension arm having a proximal end, a distal end, an upper surface, a lower surface, a clip extension located on the distal end of the second lower extension arm which emanates outward from the upper surface, and a clip receptacle which extends from the upper surface inward into the second lower extension arm;

a slot formed between the first lower extension arm and the second upper extension arm;

a first side arm having a proximal end, a distal end, an upper surface, a lower surface, and an end surface; and a second side arm having a proximal end, a distal end, an upper surface, a lower surface, and an end surface;

b. placing a medicine vial against the slot of the first base;

c. rotating the second base 180 degrees relative to the first base;

d. pushing the pair of bases together forming a vial aperture within which a medicine vial can be secured;

e. providing a tether with a first end and a second end;

f. securing the first end of the tether to the first aperture on the base; and g. securing the second end of the tether within a drug dispensing device/machine.

7. The method of claim 6 further including an aperture formed between the first side arm, the second side arm, and the first upper extension arm, wherein one end of a tether is secured to the aperture while the opposite end of the tether is secured to a drug dispensing device/machine.

8. The method of claim 6 where in the components of the medication vial lock are comprised of plastic, metal, ceramic, or a combination thereof.

9. The method of claim 6 wherein the second upper extension arm further includes the lower surface forming a niche defined by a back wall and a pair of side walls, the niche being operationally associated with the first lower extension arm.

10. The method of claim 6 wherein:

the first upper extension arm of the first base is operationally associated with the second lower extension arm of the second base;

the first upper extension arm of the second base is operationally associated with the second lower extension arm of the first base;

the second upper extension arm of the first base is operationally associated with the first lower extension arm of the second base; and the second upper extension arm of the second base is operationally associated with the first lower extension arm of the first base.

* * * * *